May 29, 1928.
G. W. McKALE
1,671,833
AUTOMATIC VALVE AND PRESSURE EQUALIZER
Filed Dec. 29, 1926
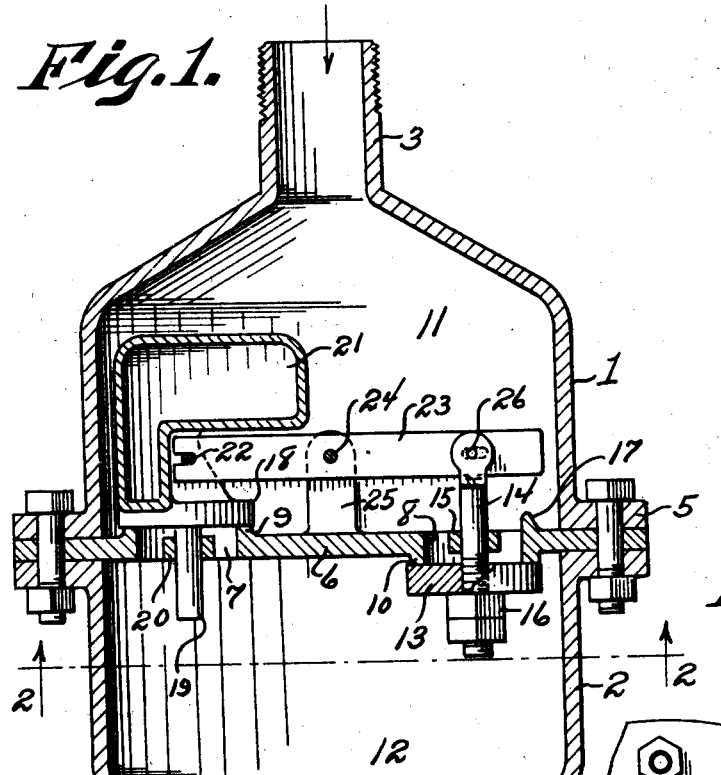
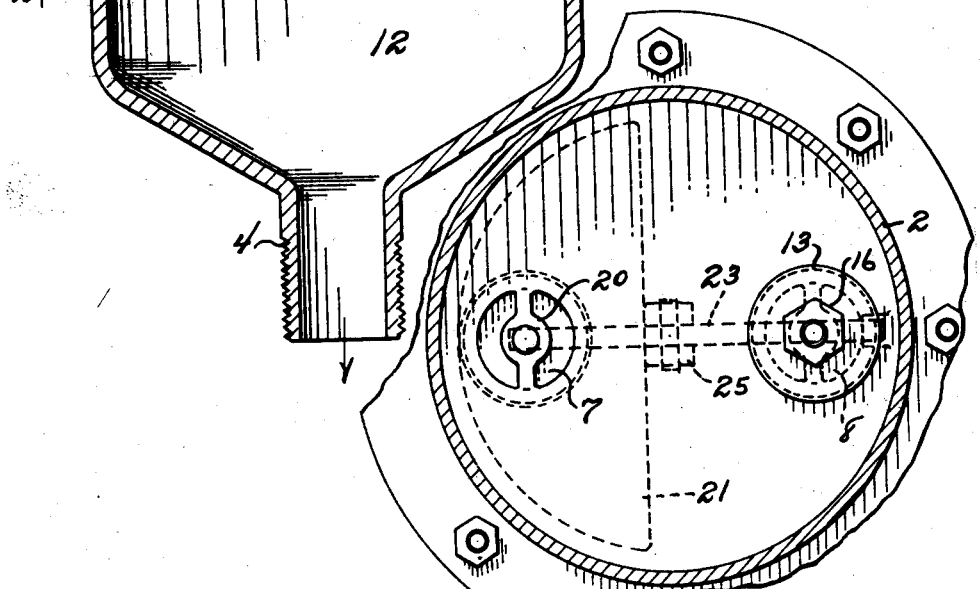
George William McKale INVENTOR
BY *Victor J. Evans*
ATTORNEY
WITNESS Patented May 29, 1928.

1,671,833

UNITED STATES PATENT OFFICE.

GEORGE WILLIAM McKALE, OF GARNETT, KANSAS.

AUTOMATIC VALVE AND PRESSURE EQUALIZER.

Application filed December 29, 1926. Serial No. 157,812.

My present invention has reference to an automatic valve and pressure equalizer and resides in the novel construction, combination and operative association of parts hereinafter described and definitely claimed.

A further object is the provision of a device for this purpose which is of a simple construction, comprising few easily associated parts and which shall be reliable and efficient in practical use.

The drawings illustrate a satisfactory embodiment of my improvement.

In the drawings:

Figure 1 is a substantially vertical longitudinal sectional view through the improvement.

Figure 2 is a horizontal sectional view approximately on the line 2—2 of Figure 1.

In draining oil or other fluids from a tank, especially where suction pumps and gravity systems are used, trouble is encountered by air filling the line after the fluid has been drawn out. My improvement obviates this as the same equalizers the pressure in the system.

The improvement comprises a cylindrical body which is perferably formed of two sections 1 and 2, respectively. The sections 1 and 2 have their ends flared and merge into reduced neck extensions 3 and 4 which are tubular and which are exteriorly threaded. The neck 3 is connected to the outlet pipe for the oil or other fluid tank, and the neck 4 is connected to the outlet pipe for the system.

In the showing of the drawings the confronting ends of the tubular sections 1 and 2 of the hollow body of my improvement are formed with outstanding flanges 5, and bolted or otherwise effectively secured between these flanges, to provide a fluid tight joint there is a flat disc 6. This disc, at points opposite its center, has round openings 7 and 8 therethrough, the opening 7 being surrounded by an upstanding annular flange 9 and the opening 8 being surrounded by a depending flange 10. The disc 6, provides a partition that divides the tubular body of the improvement into an upper compartment 11 and a lower compartment 12. In the lower compartment and finding a seat on the flange 10 there is a valve 13. The stem 14 for this valve passes through a guide lug 15 in the said opening 8. This stem has a threaded end onto which are screwed nuts 16 that adjust the valve with respect to its seat, and the face of the plate in the upper compartment 11 is, preferably in a line with the outer wall provided by the opening 8, formed with a lug 17 whose purpose will presently be apparent.

Normally seated on the flange 9 there is a second disc valve 18. This valve has a stem 19 that passes through a guide lug 20 in the opening 7, and there may be formed on the upper face of the valve 18 a hollow float 21. Loosely connected to the float, as at 22, there is a lever 23. This lever is pivotally supported, as at 24, to a lug 25 that projects upwardly from the center of the disc or partition 6. The lever 23 is also loosely connected, as at 26, to the stem 14 for the valve 13. The valves have ground faces which contact with their seats.

The hollow body or chamber 1 is air tight with the exception of its inlet and outlet ports 3 and 4 which I have termed the necks thereof. Of course, the valve 13 opens downwardly into the compartment 12, and the valve 18 opens upwardly into the compartment 11. By this arrangement the suction (vacuum) from the line applied to the lower compartment will not freeze, or in other words cause the sticking of the valves on their seats as the suction pulling down on the valve 13 will have a tendency to open the valve with the same force that it will have to close and keep closed the valve 18. In other words, the force of the vacuum is equalized. The weight of the float 21 is sufficient to normally hold the valves closed and is of a sufficient size to overcome friction in lifting the valve 18 when the said float is buoyed by the fluid entering the upper compartment 11. The fluid will influence the float 21 when the upper compartment is filled which, as stated, will raise the valve 18 from its seat and lower the valve 13 from its seat, thus simultaneously opening both of the valves. Were only one valve employed after the tank has been emptied there would be a vacuum or partial vacuum formed in the lower compartment 12 and the valve would be either held closed or opened accordingly, but obviously with my arrangement the force of the vacuum on the valves is equalized and when the upper compartment is kept filled by the fluid coming from the tank the float will keep both of the valves open and allow the liquid to pass on into the lower compartment and thence on out into the conduit line to its destination. On the other hand when the tank is emptied nothing but air will remain in the upper compartment 11 and the weight of the float will influence both of the valves to closed position, so that air is prevented from entering further into the conduit line, and as the valves are arranged opposite each other they will not be held tight when another tank of liquid is turned into the pipe line.

A downward swinging of the lever 23 is limited by its contact with the lug 17.

The drawings illustrate a satisfactory embodiment of the improvement which has herein been described, but obviously the invention is susceptible to changes and modifications. Instead of specially constructed body sections 1 and 2 swage nipples of the proper size may be employed and connected to a partition or disc 6 in any desired or preferred manner, the said nipples being respectively connected to the tank and to the conduit. The valve construction remains the same in all events and the openings 7 and 8 are of the same size and provided with stems which are suitably guided to insure the proper seating of the valves. By providing the stem 14 with the threaded end it is obvious that the adjustment of the holding and lock nuts 16 will regulate the position of the valve 13 on the said stem and likewise regulate the valve with respect to its seat. If desired, the connection between the valves and the lever may be in the form of hinge or pivot joints, and the active faces of the valves may have secured thereon compressible gaskets or the like.

The improvement is not to be limited to a body of cylindrical formation as the same may be of any desired shape and size. Preferably the valve 13 threadedly engages the stem 14, and it will be obvious that by adjusting this valve on the stem and likewise adjusting the nut 16 on said stem both this valve 13 and the valve 18 will be adjusted with respect to their seats.

Having described the invention, I claim:—

In a device to assist in draining oil from tanks, a cylindrical body consisting in two sections, each section having one end tapered and merged into reduced neck extensions which are tubular and exteriorly threaded, flanges on each of the sections on the end opposite to the threaded end, a flat disk adapted to fit between the two sections, upstanding valve seats on opposite sides of the disk, valves connected together seating on the said seats, and fastening means passing through the flanges and through the disk securely holding the two sections together.

In testimony whereof I affix my signature.

GEORGE WILLIAM McKALE.